Aug. 7, 1945.   K. FROEHLICH   2,381,273
INDICATOR DRIVE FOR RECIPROCATING ENGINES
Filed March 25, 1943   2 Sheets-Sheet 2

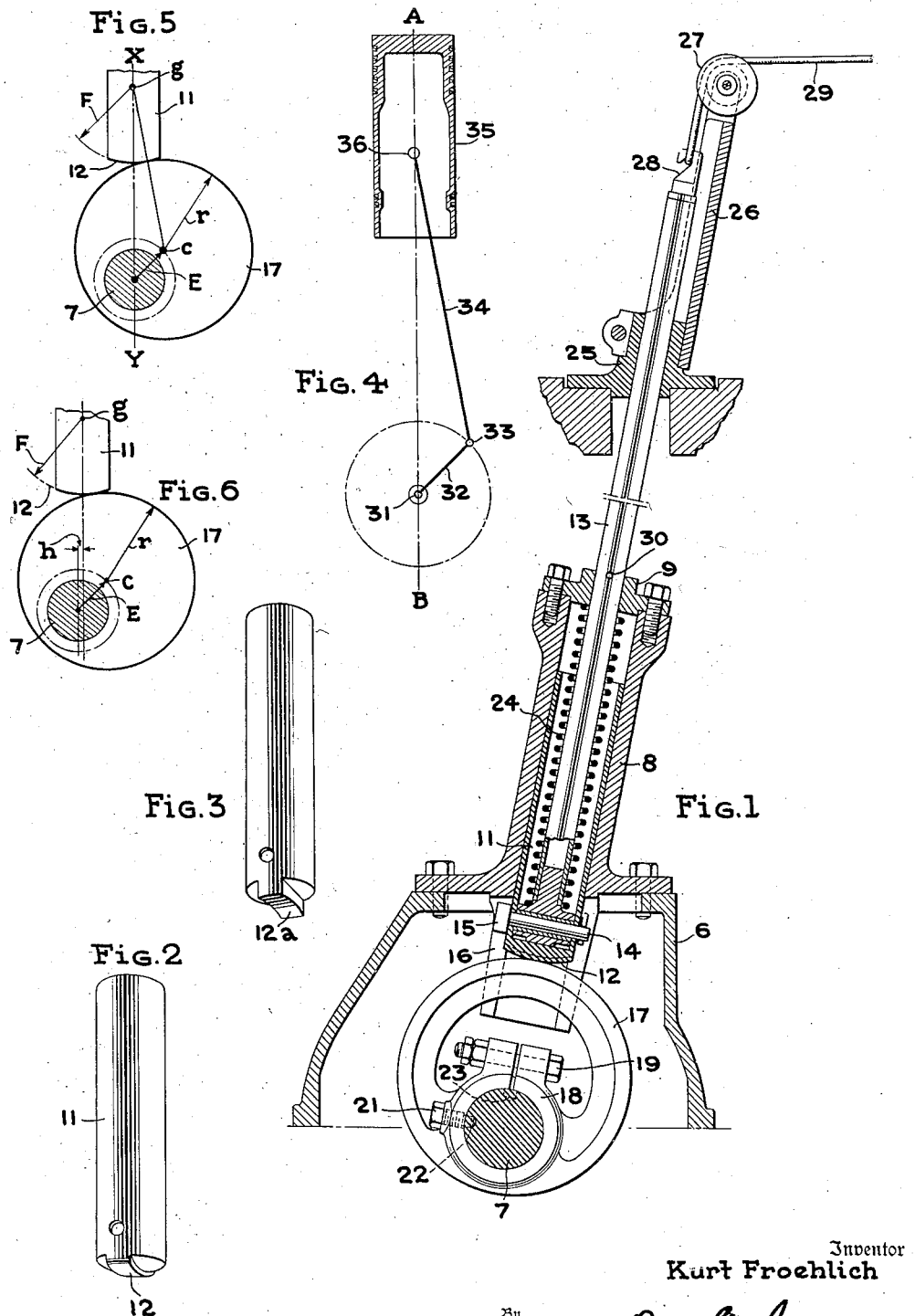

Inventor
Kurt Froehlich
By
Attorneys

Patented Aug. 7, 1945

2,381,273

UNITED STATES PATENT OFFICE 2,381,273

INDICATOR DRIVE FOR RECIPROCATING ENGINES

Kurt Froehlich, Milwaukee, Wis., assignor to Nordberg Manufacturing Company, Milwaukee, Wis., a corporation of Wisconsin Application March 25, 1943, Serial No. 480,553

6 Claims. (Cl. 234—24)

This invention relates to driving motions for the drums of engine indicators. More specifically, it relates to improvements in motions of the cam and follower type and is so arranged as precisely to simulate the motion of the engine piston.

The cam is a circular eccentric which may be standardized as to eccentricity and diameter, and still be adapted to almost any engine (within reasonable ranges of size). The cam follower is standardized in all respects except one. That one is the radius of a cylindrical thrust face which coacts with the eccentric cam. Assuming a standardized cam, the radius in question becomes a simple function of the ratio of engine connecting-rod to engine crank.

The circular eccentric is economical to manufacture and the formation of a chosen cylindrical thrust surface of any needed radius in the follower is a very simple operation. In consequence a desirable design of general applicability and capable of giving precise motion is made available.

The invention will be described as embodied for use with a group of two cycle Diesel engines of different sizes. These particular engines have cam shafts which extend along the side of the engine near the lower ends of the cylinder and turn at crankshaft speed, so that the indicator motion cams may be mounted on this cam shaft. Any shaft turning at crankshaft speed will serve, so the drawings are merely illustrative, and represent only one of various possible arrangements. The inventive concept is adaptable to engines of various different designs to the same extent that cam and follower motions are adaptable.

In the drawings:

Fig. 1 is a vertical axial section of the indicator motion illustrated as applied to the cam shaft of a vertical two cycle fuel injection engine.

Fig. 2 is a perspective view of the cam follower.

Fig. 3 is a similar view of a modified follower.

Fig. 4 is a diagram on a greatly reduced scale of the engine piston connecting rod and crank.

Fig. 5 is a diagram of the indicator motion in the position corresponding to the position shown in Fig. 4. Fig. 5 is drawn on a much less reduced scale than is Fig. 4.

Fig. 6 is a view similar to Fig. 5 but showing the device arranged for use with an engine having an offset cylinder.

Figure 9:
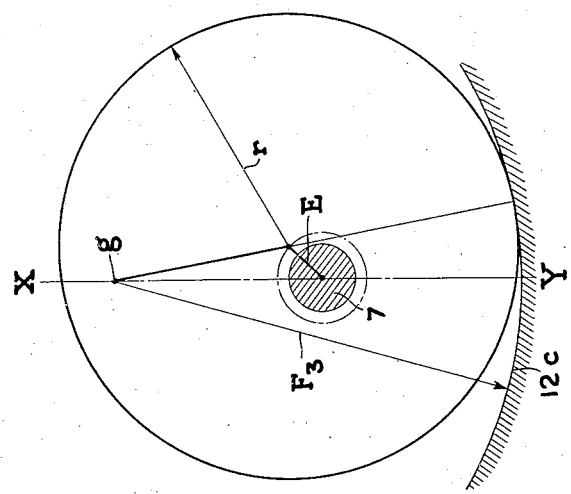
Figs. 7, 8 and 9 are diagrams for use in explaining the derivation of alternative cam follower surfaces.

In Fig. 1, 6 represents a portion of the structure which houses the cam shaft 7 of the engine. In a two cycle engine, the cam shaft 7 rotates at crank shaft speed. The mechanisms that the cam shaft operates are immaterial to the present invention. There would be several indicator motions on any multiple cylinder engine, commonly one for each cylinder, though sometimes it is sufficient to provide one for each crank throw. Only one indicator drive is shown in Fig. 1. Mounted on the housing 6 above the cam shaft 7 is a bonnet 8 which is fastened with studs and which carries a guide cap 9 held in place by machine screws. The cam follower is a cup-shaped member 11 (see Fig. 2) which has an area 12, which is a portion of a right circular cylinder formed as an arcuate boss on its lower end. The axis of the circular cylindrical area 12 must be parallel with the axis of the cam shaft 7 and this result is secured by pinning the follower 11 to the motion transmitting rod 13 by means of a transverse pin 14. Pin 14 has a squared head 15 which coacts with guides 16 projecting downward from the bonnet 8 and arranged to straddle the cam 17.

The cam 17 is circular and is mounted eccentrically on the shaft 7. The cam is thus a simple circular eccentric and will be referred to as such hereinafter. It is clamped on the shaft 7 by means of an integral split collar 18 with clamping bolt 19. Its position is accurately determined by a staking screw 21. The staking screw is shown engaged in the counterbore 22 formed in the shaft. There is a second counterbore 23 spaced 90° from the counterbore 22 to permit the cam to be set in two angular positions 90° from one another on the cam shaft.

The motion transmitting rod 13 is urged toward the cam 17 by a coil compression spring 24 and extends upward through a secondary guide 25 mounted at or near the deck customarily present near the cylinder heads of large engines of the type under consideration. Extending upward from the guide 25 is a bracket 26 with guide sheave 27. On the upper end of the rod 13 is a hook 28 to which the end of the cord 29 is attached by a loop or other equivalent means. The cord 29 leads to the part of the indicator to be actuated in time with the engine piston. This is ordinarily the reel on the drum which carries the indicator card.

The hole 30 in the motion-transmitting rod 13 is intended to receive a pin which holds the cam follower 11 out of contact with the cam 17 when the indicator mechanism is not in use.

Since the indicator motion must reproduce on a reduced scale the motion of the wrist pin of the engine and since this motion is a function of the ratio of the length of the connecting rod to the crank arm, the basic components of the engine are diagrammed in Fig. 4 and are there identified as follows: Crank shaft 31, crank 32, crank pin 33, connecting-rod 34, piston 35, and wrist pin 36. As indicated by the line A—B, the path of the wrist pin 36 when extended passes through the axis of the crank shaft 31. In this view the length of the connecting rod 34 is four times the length of the crank 32. The ratio of connecting rod to crank varies with the design of the particular engine, and hereinafter will be represented by the letter R.

Referring now to Fig. 5. The essential components of the indicator drive are identified by the same reference numerals as are used in Fig. 1. In that view the eccentric 17 is shown mounted on the shaft 7 with an eccentricity represented by the letter E. The radius of the circular eccentric 17 is represented by the letter $r$; the radius of the circular cylindrical thrust face 12 is indicated by the letter F. Thus the point $g$ corresponds to the axis of the wrist pin 36, the point $c$ corresponds to the axis of the crank pin 33, the eccentricity E corresponds to the crank 32, and the imaginary connecting rod corresponding to the connecting-rod 34 is the line $g$—$c$ which is always equal to $F+r$. In other words, the imaginary connecting-rod in Fig. 5 is the geometrical equivalent of a connecting rod having a wrist pin and a crank pin so large that they are tangent to one another.

Thus it follows that if the cam shaft 7 turns at crank shaft speed, the point $g$ in Fig. 5 and the axis of wrist pin 36 will move through different lineal distances but with the same characteristic motions, that is, their rates of acceleration and deceleration will be absolutely the same provided the imaginary connecting rod in Fig. 5 has the same ratio to the eccentricity that the connecting-rod 34 has to the crank 32.

In order to standardize the motion to the greatest extent possible, the desirable practice is to standardize the eccentric 17. It then has a standard radius $r$ and a standard eccentricity E. Adjustment for the ratio R of any particular engine is made by selection of the dimension F.

Since precise reproduction of the motion requires that the following equation be satisfied:

$$\frac{F+r}{E}=R$$

it follows that:

$$F=R \times E-r$$

In other words, the radius of the follower is determined by multiplying the eccentricity of the eccentric by the connecting-rod to crank ratio of the engine and subtracting from the product the radius of the eccentric.

In Fig. 5 the line X—Y which represents the extended path of the point $g$ passes through the axis of the cam shaft 7, and this is necessary since the line A—B in Fig. 4 passes through the axis of the crank shaft. For simplicity, the line X—Y of Fig. 5 is shown parallel with the line A—B of Fig. 4, whereas in Fig. 1 the center line of the cam follower 11 is shown slightly inclined to the vertical as a matter of convenience. It is probably unnecessary to state that the angular position of the eccentric 17 on the shaft 7 in Fig. 1 is modified to correspond. Fig. 1 shows conditions at an engine dead-point.

In double acting engines and in reversible engines, the line A—B representing the projected path of the wrist pin, passes through the axis of the crank shaft but some single acting irreversible engines are built with the cylinders offset, in which case the line corresponding to the line A—B would pass to one side of the center line of the crank shaft.

It will be obvious from the diagram of Fig. 5 that since the indicator motion here disclosed geometrically reproduces crank and connecting-rod action, the motion of an offset piston can be precisely reproduced provided the line X—Y be offset in the same proportion as is the line A—B.

Fig. 6 shows the same parts as appear in Fig. 5 but with the line X—Y offset by the distance $h$. The distance $h$ is a function of the offset of the line AB for the engine used. A simple proportion is involved, as follows:

$$\frac{h}{\text{offset of line } AB} = \frac{E}{\text{crank radius}}$$

Ordinarily, and to permit direct connection of the cord 29 to the indicator drum, the eccentricity E is half the desired circumferential motion of the indicator reel.

While the shaft 7 has been described as the cam shaft, it can be any shaft turning at crank shaft speed, not excluding the crank shaft itself.

The use of the crank shaft, or any other large shaft, may require a slightly different mechanical arrangement from that shown in Fig. 1. A large shaft requires an even larger eccentric, and since E is determined by the desired extent of motion, a condition may exist in particular cases in which the radius of the eccentric exceeds the length of the required imaginary connecting rod. In other words $$r > R \times E$$

In such cases it is only necessary to change the position of the eccentric relatively to the engine crank and to make the follower of appropriate radius but concave instead of convex. This will become clear upon consideration of Figs. 7 to 9.

Figure 7:
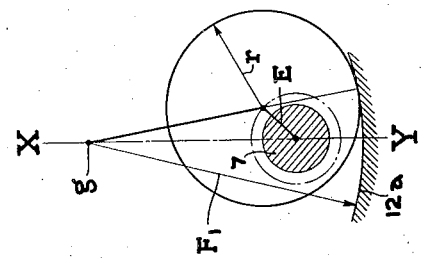

Fig. 7 is a geometric diagram similar to Fig. 5, but instead of the surface 12 makes use of a concave arcuate follower surface 12a whose radius is $F_1$. The radius F (Fig. 5) and radius $F_1$ (Fig. 7) are related functions of $E \times R$:

$$F = E \times R - r$$
$$F_1 = E \times R + r$$

The two follower surfaces 12 and 12a impose precisely the same reciprocatory motion of the follower.

Figure 8:
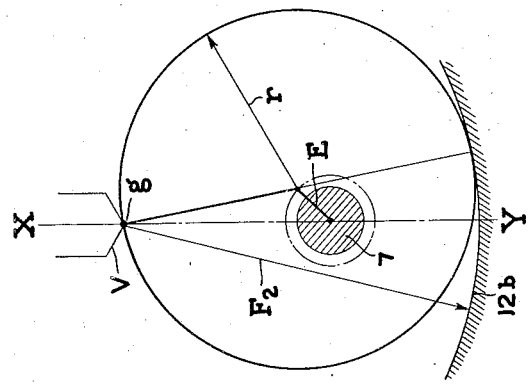

In Fig. 8 is diagrammed the special case where $r = R \times E$. Thus the analog of F becomes zero and $F_2 = 2r$. The perimeter of the eccentric passes through $g$. One can then use a sharp edged follower V, or a concave arcuate follower surface 12b whose radius is $2r$ and derive the same motion as in Fig. 7.

In Fig. 9 a case where $r > R \times E$ is illustrated. The concave arcuate surface 12c gives precisely the same motion as may be had by the arrangement shown in Figs. 5, 7 and 8. Here $$F_3 = E \times R + r$$

Thus the size of the eccentric determines the form of the follower but according to the invention the geometry is such that the follower motion is identical in all three cases illustrated in Figs. 7–9 inclusive.

A crank and connecting rod gives only an approximation to harmonic motion. The approximation is closer when the ratio R is large than when it is small but the velocity diagram of the wrist pin is always asymmetric. The invention can be used to produce the identical asymmetric velocity diagram on any desired scale.

Reverting now to Figs. 1 and 2, a concave follower surface such as 12a can be formed on the end of sleeve 11 as shown in Fig. 3 instead of the convex one shown in Figs. 1 and 2 but if this is done a compensating factor should be introduced because the effect would be to put the asymmetric characteristic of reciprocation of rod 13 180° out of phase with the asymmetric characteristic of reciprocation of piston 35. The simplest but not the only possible correction is to shift the eccentric 180°.

Thus with a convex follower, as shown in Fig.1, the eccentric 17 reciprocates the follower in phase with wrist pin 36. With a concave surface, a similarly located follower should reciprocate 180° out of phase with the wrist pin because the imaginary connecting rod of the cam motion is reversed in its direction from the arrangement shown in Fig. 7.

While the cam follower surfaces have been described as cylindrical, cylindrical surfaces are used simply to secure the advantage of line contact as compared to point contact. They are desirable but not essential.

The novelty in the present disclosure resides in the dimensional relationship used to secure a precise reproduction of wrist pin motion and the invention may be modified and applied generally to any situation where a cam and follower indicator motion is applicable.

The commercially important consideration is the fact that it is possible to manufacture for a considerable range of engines, eccentrics which are standard as to radius and as to eccentricity and which need only to be bored to fit the particular shaft. The followers 11 may be readily interchanged and the follower to be used for any particular engine may be given a reaction face appropriate to the connecting-rod crank ratio of that engine. The formation of this cylindrical reaction face is a very simple operation. Consequently, the invention gives the benefits of standardization while meeting the requirements of absolute accuracy.

The purpose of the second counterbore 23 is to permit the eccentric to be positioned 90° out of phase with the crank so that what are known in the Diesel engine industry as 90° cards may be taken. The purpose is to shift the combustion range to mid-length of the card where the pressure characteristic can be better studied.

What is claimed is:

1. For use with an engine having a wrist pin which is guided in a right line, a crank, and a rod which connects the wrist pin and crank, and in which the ratio of effective rod length to effective crank line has a value R; an indicator drive comprising in combination a circular eccentric adapted to be driven at the same angular velocity as the crank and having a radius $r$ and an eccentricity E; a follower having a reaction face engaged by the eccentric, said face being a right cylinder whose directrix is a circular arc whose plane is normal to the axis of rotation of the eccentric and whose radius differs from the distance $R \times E$ by an amount equal to $r$; means serving to guide said follower in a right line and so positioned that the path of the geometrical center of said arc has the same relation to the center of rotation of the eccentric as the path of the wrist pin has to the axis of rotation of the crank; and means for connecting said follower to the part of the indicator which simulates the motion of the cross head of the engine.

2. For use with an engine of the type specified in claim 1 in which the path of the wrist pin passes through the axis of rotation of the crank; an indicator drive comprising the combination defined in claim 1 further characterized in that the path of the geometrical center of said arc when projected passes through the axis of rotation of the eccentric.

3. The combination defined in claim 1, in which the reaction face of the follower is convex and its radius is $R \times E - r$.

4. The combination defined in claim 1, in which the reaction face of the follower is concave and its radius is $R \times E + r$.

5. The combination defined in claim 1, in which the reaction face of the follower is concave and its radius is $R \times E + r$, and the crank and eccentric are relatively so positioned that the wrist pin and follower reciprocate 180° out of phase.

6. For use in an engine of the type specified in claim 1 in which the path of the wrist pin is laterally offset so as not to pass through the axis of rotation of the crank; an indicator drive comprising the combination defined in claim 1 further characterized in that the path of the geometrical center of said arc is proportionately offset relatively to the axis of rotation of the eccentric.

KURT FROEHLICH.